(12) United States Patent
Brown et al.

(10) Patent No.: US 9,479,699 B2
(45) Date of Patent: Oct. 25, 2016

(54) SHAPE MEMORY ALLOY ACTUATION APPARATUS

(75) Inventors: Andrew Benjamin David Brown, Cambridge (GB); Robert John Leedham, Cambridge (GB); Mark George Easton, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 313 days.

(21) Appl. No.: 13/988,034

(22) PCT Filed: Nov. 15, 2011

(86) PCT No.: PCT/GB2011/001609
§ 371 (c)(1),
(2), (4) Date: Jul. 26, 2013

(87) PCT Pub. No.: WO2012/066285
PCT Pub. Date: May 24, 2012

(65) Prior Publication Data
US 2013/0300880 A1 Nov. 14, 2013

(30) Foreign Application Priority Data
Nov. 18, 2010 (GB) .................................. 1019532.9

(51) Int. Cl.
*H04N 5/232* (2006.01)
*G03B 3/10* (2006.01)
*F03G 7/06* (2006.01)

(52) U.S. Cl.
CPC .......... *H04N 5/23248* (2013.01); *F03G 7/065* (2013.01); *G03B 3/10* (2013.01); *G03B 2205/0076* (2013.01)

(58) Field of Classification Search
CPC ................ H04N 5/23248; G03B 3/10; G03B 2205/0076; F03G 7/065
See application file for complete search history.

(56) References Cited

U.S. PATENT DOCUMENTS

| 4,977,886 | A | 12/1990 | Takehana et al. |
| 5,763,979 | A | 6/1998 | Mukherjee et al. |
| 6,307,678 | B2 * | 10/2001 | Kosaka ............ G03B 5/00 359/554 |

(Continued)

FOREIGN PATENT DOCUMENTS

| EP | 2239610 A1 | 10/2010 |
| GB | 2280957 A | 2/1995 |

(Continued)

OTHER PUBLICATIONS

U.S. Appl. No. 13/146,475, filed Jul. 27, 2011.

(Continued)

*Primary Examiner* — Twyler Haskins
*Assistant Examiner* — Peter Chon
(74) *Attorney, Agent, or Firm* — Harness, Dickey & Pierce, P.L.C.

(57) ABSTRACT

An SMA actuation apparatus comprises a support structure, a movable element movably supported on the support structure and an arrangement of three or more SMA actuator wires mechanically connected between the support structure and the movable element. The SMA actuator wires have an interconnection at the movable element that electrically connects the group of SMA actuator wires together. This avoids the need to make a separate electrical connection to the movable element.

34 Claims, 8 Drawing Sheets

(56) References Cited

U.S. PATENT DOCUMENTS

| | | | |
|---|---|---|---|
| 6,449,434 B1 | 9/2002 | Fuss | |
| 6,574,958 B1 | 6/2003 | MacGregor | |
| 6,945,045 B2 | 9/2005 | Hara et al. | |
| 8,830,335 B2* | 9/2014 | Topliss | G02B 7/08 348/208.11 |
| 2002/0113499 A1 | 8/2002 | von Behrens et al. | |
| 2006/0266031 A1* | 11/2006 | Kosaka | G02B 7/102 60/527 |
| 2006/0272328 A1 | 12/2006 | Hara et al. | |
| 2008/0278030 A1* | 11/2008 | Hara | G02B 7/08 310/307 |
| 2008/0278590 A1* | 11/2008 | Tanimura | G03B 3/10 348/208.99 |
| 2009/0295986 A1* | 12/2009 | Topliss | F03G 7/065 348/374 |
| 2010/0074607 A1* | 3/2010 | Topliss | G02B 7/005 396/133 |
| 2012/0038703 A1 | 2/2012 | Taya et al. | |
| 2012/0123737 A1 | 5/2012 | Hansen | |
| 2013/0002933 A1 | 1/2013 | Topliss et al. | |

FOREIGN PATENT DOCUMENTS

| | | |
|---|---|---|
| JP | H05-104475 A | 4/1993 |
| JP | 2004-069950 A | 3/2004 |
| WO | WO-2007/113478 A1 | 10/2007 |
| WO | WO-2008/099156 A2 | 8/2008 |
| WO | WO-2008/129290 | 10/2008 |
| WO | WO-2010/029316 A2 | 3/2010 |
| WO | WO-2010/058177 A2 | 5/2010 |
| WO | WO-2010/089529 A1 | 8/2010 |
| WO | WO-2011/104518 A1 | 9/2011 |
| WO | WO-2012/020212 A1 | 2/2012 |
| WO | WO-2012/038703 A2 | 3/2012 |
| WO | WO-2012/123737 A1 | 9/2012 |

OTHER PUBLICATIONS

U.S. Appl. No. 13/063,661, filed May 16, 2011.
U.S. Appl. No. 12/295,382, filed Sep. 30, 2008.
U.S. Appl. No. 13/825,362, filed Mar. 21, 2013.
U.S. Appl. No. 13/581,150, filed Sep. 19, 2012.
U.S. Appl. No. 13/814,766, filed May 14, 2013.

* cited by examiner

SHAPE MEMORY ALLOY ACTUATION APPARATUS

CROSS-REFERENCE TO RELATED APPLICATIONS

This application is a 371 U.S. National Stage of International Application No. PCT/GB2011/001609, filed on Nov. 15, 2011. This application claims priority to British Patent Application No. 1019532.9, filed on Nov. 18, 2010. The contents of the above are herein incorporated by reference in their entirety.

The present invention relates to the use of SMA (shape memory alloy) actuator wires to provide positional control of a movable element supported on a support structure.

There are a variety of types of apparatus in which it is desired to provide positional control of a movable element. SMA actuator wire is advantageous as an actuator in such an apparatus, in particular due to its high energy density which means that the SMA actuator required to apply a given force is of relatively small size. One non-limitative type of apparatus in which SMA actuator wire is known for use as an actuator is a camera, particularly a miniature camera.

In many applications, it is desirable to provide movement in multiple directions. This generally requires the provision of an arrangement of multiple SMA actuator wires mechanically connected between the support structure and the movable element. To control such an arrangement, drive signals are provided to the respective SMA actuator wires that heat the SMA actuator wires causing them to contract and thereby controlling the displacement of the movable element.

By way of non-limitative example, WO-2011/104518 discloses an SMA actuation apparatus comprising an arrangement of eight SMA actuator wires inclined with respect to a notional primary axis with two SMA actuator wires on each of four sides around the primary axis, the SMA actuator wires being mechanically connected between the movable element and the support structure so that on contraction two groups of four SMA actuator wires provide a force on the movable element with a component in opposite directions along the primary axis. The SMA actuator wires of each group are arranged with 2-fold rotational symmetry about the primary axis, so that they drive rotation and/or displacement laterally of the primary axis. As described in WO-2011/104518, the apparatus may be a camera in which the movements provide optical image stabilisation (OIS) and in some cases focussing of the camera.

In WO-2011/104518, in cases where control is implemented with the maximum number of degrees of freedom, the control circuit comprises a drive circuit connected to each SMA actuator wire that supplies a drive signal to the SMA actuator wire that is controlled using electrical resistance as a feedback parameter. In particular, the drive circuit measures the resistance of the respective SMA actuator wire and varies the drive signal on the basis of an error between a target resistance for that SMA actuator wire and the measured resistance in a closed-loop control algorithm. To effect this control, each drive circuit is connected to a respective SMA actuator wire at the support structure and at the movable element.

The present invention is concerned with improving this arrangement.

According to the present invention, there is provided an SMA actuation system comprising:

a support structure;

a movable element movably supported on the support structure;

an arrangement of three or more SMA actuator wires mechanically connected between the support structure and the movable element, the SMA actuator wires being arranged on contraction thereof to drive displacement of the movable element relative to the support structure, a group of three or more of the SMA actuator wires having an interconnection at the movable element that electrically connects the group of SMA actuator wires together.

In contrast to the apparatus disclosed in WO-2011/104518, a group of three or more of the SMA actuator wires has an interconnection at the movable element that electrically connects the group of SMA actuator wires together. It has been appreciated that this arrangement including the interconnection allows separate control of each SMA actuator wire whilst reducing the number of electrical connections that need to be made at the movable element. In particular, no electrical connections to the group of SMA actuator wires need to be made at the movable element. The group of SMA actuator wires may consist of all the SMA actuator wires, in which case no electrical connections at all need to be made at the movable element.

The reduction or absence of electrical connections that need to be made at the movable element is advantageous because any additional electrical connection between the support structure and the movable element will inevitably also have mechanical properties that may impede the motion of the movable element relative to the support structure. The electrical connection may be designed to minimise the impact of its mechanical properties on the motion, but this is difficult to achieve in practice and will also add to the cost and complexity of the design. Consequently it is desirable that there are no additional connections between the movable element and the support structure other than the SMA actuator wires.

Even in the absence of such electrical connections, it has been appreciated that the heating of individual SMA actuator wires in the group may be achieved by supplying drive signals selectively through different combinations of SMA actuator wires in the group on each side of the interconnection at the movable element. In one example that is illustrative but not limitative, the drive signals may be supplied selectively through different combinations that consist of one of the SMA actuator wires on one side of the interconnection at the movable element and plural SMA actuator wires, for example all of the remaining SMA actuator wires, in parallel on the other side of the interconnection at the movable element. In this case, the one SMA actuator wire is heated predominantly, because the plural SMA actuator wires are arranged in parallel. The current flowing through the one SMA actuator wire is split between the plural SMA actuator wires. Further, the voltage across the plural SMA actuator wires is reduced by the parallel arrangement reducing their overall resistance.

The apparatus may further comprise a control circuit electrically connected to the group of SMA actuator wires at the support structure for supplying drive signals to the SMA actuator wires.

Furthermore, the heating of the individual SMA actuator wires may be controlled using the electrical resistance as a feedback parameter. This requires a measure of the resistance of each SMA actuator wire to be derived, and it has been appreciated that this can in fact be achieved even without electrical connections to the group of SMA actuator wires needing to be made at the movable element. If there is no electrical connection to the group of SMA actuator wires at the movable element, then the resistance of each SMA actuator wire cannot be measured directly, but it has been appreciated that a measure of the resistance of each SMA actuator wire can be achieved indirectly.

In particular, this may be achieved by supplying signals to the group of SMA actuator wires and making measurements of voltages and/or currents across the group of SMA actuator wires during the supply of said signals and to derive a measure of the resistance of each SMA actuator wire from the measurements. Some examples that are illustrative but not limitative are as follows.

In one example, the signals consist of signals supplied through different combinations of the SMA actuator wires on each side of the interconnection at the movable element. In this case, a measure of the resistance of each SMA actuator wire is derived as a function of the measurements across the different combinations of the SMA wire. For example, the signals may be signals supplied to one of the SMA actuator wires on one side of the interconnection at the movable element and all of the remaining SMA actuator wires in the group in parallel on the other side of the interconnection at the movable element. The different combinations have an overall resistance that is a different function of the resistances of the individual SMA actuator wires. Accordingly, measurements of different combinations make it possible to derive a measure of the resistance of each SMA actuator wire.

In another example, the signals consist of signals supplied through one of the SMA actuator wires on one side of the interconnection at the movable element whilst no signal is supplied through at least one other of the SMA actuator wire so that the voltage of the end of that other SMA actuator wire at the support structure follows the voltage at the interconnection at the movable element. In this case, a measure of the resistance of the one of the SMA actuator wires is derived directly from measurements of the voltages at the ends of the SMA actuator wires at the support structure.

The control circuit may therefore further comprise a resistance measurement section arranged to make measurements of voltages and/or currents across the group of SMA actuator wires during the supply of said signals, and may be arranged to supply signals to the group of SMA actuator wires and to derive a measure of the resistance of each SMA actuator wire from the measurements. The control circuit may then control the heating of the individual SMA actuator wires using the measure of electrical resistance as a feedback parameter, for example varying the heating of individual SMA actuator wires on the basis of an error in respect of each actuator wire between a target resistance for that SMA actuator wire and the measure of resistance for that SMA actuator wire.

To allow better understanding, embodiments of the present invention will now be described by way of non-limitative example with reference to the accompanying drawings, in which.

Figure 1:
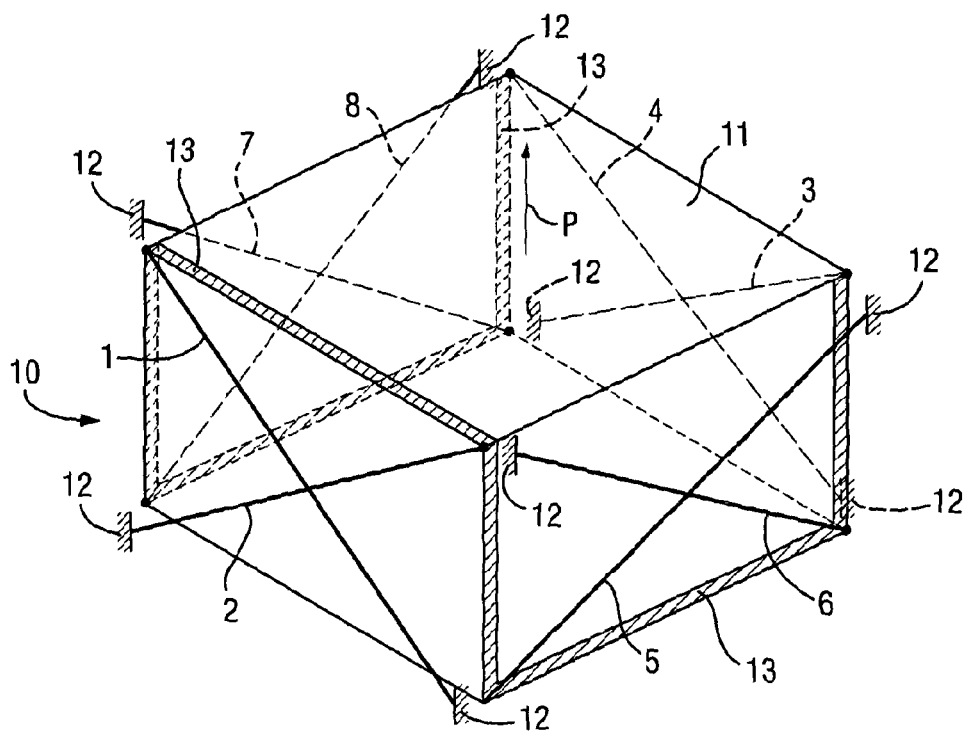
FIG. 1 is a perspective view of an SMA actuation apparatus.

An SMA actuation apparatus 10 is shown in FIG. 1 and will now be described. A movable element 11 is supported on a support structure 12 by eight SMA actuator wires 1-8. The arrangement of the SMA actuator wires 1-8 varies but common elements have common reference numerals.

The movable element 11 may in general be any type of element. The movable element 11 has a square shape as viewed along a primary axis P but more generally could have any shape. The support structure 12 is illustrated schematically but could in general be any type of element suitable for supporting the movable element 11. The support structure 12 supports the movable element in a manner allowing movement of the movable element 11 relative to the support structure. The movable element 11 is supported on the support structure 12 solely by the SMA actuator wires 1-8 but in principle the SMA actuation apparatus 10 could comprise a suspension system additionally supporting the movable element 11 on the support structure 12.

Each SMA actuator wire 1-8 comprises a piece of SMA wire connected at each end to a respective one of the movable element 11 and the support structure 12, possibly via an intermediate component. Any suitable means that provides mechanical connection may be used, for example, a crimping member, optionally strengthened by the use of adhesive.

In addition, electrical connections are made to the SMA actuator wires 1-8 at each end, for example by the crimping member when used. At the ends of the SMA actuator wires 1-8 at the support structure 12, the SMA actuator wires 1-8 are electrically connected to a control circuit 20 described below. At the ends of the SMA actuator wires 1-8 at the movable element 11, the SMA actuator wires 1-8 are electrically connected together by an interconnection 13. The interconnection 13 may be formed by a conductive element of any conductive material, typically a metal. The interconnection 13 may in general have any shape. The interconnection 13 has no electrical connections to the support structure or control circuit 20, other than through the SMA actuator wires 1-8.

Each SMA actuator wire 1-8 extends along a side of the primary axis P perpendicular to a notional line radial of the primary axis P and inclined with respect to the primary axis. Each SMA actuator wire 1-8 is held in tension, thereby applying a component of force in a direction along the primary axis P and a component of force in a lateral direction perpendicular to the primary axis P.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 1-8 causes them to decrease in length. The SMA actuator wires 1-8 may be made of any suitable SMA material, for example Nitinol or another Titanium-alloy SMA material. Advantageously, the material composition and pre-treatment of the SMA actuator wires 1-8 is chosen to provide phase change over a range of temperature that is above the expected ambient temperature during normal operation and as wide as possible to maximise the degree of positional control.

On heating of one of the SMA actuator wires 1-8, the stress therein increases and it contracts. This causes movement of the movable element 11. A range of movement occurs as the temperature of the SMA increases over the range of temperature in which there occurs the transition of the SMA material from the Martensite phase to the Austenite phase. Conversely, on cooling of one of the SMA actuator wires 1-8 so that the stress therein decreases, and it expands under the force from opposing ones of the SMA actuator wires 1-8. This allows the movable element 11 to move in the opposite direction.

The position of the movable element 11 relative to the support structure 12 along the optical axis O is controlled by varying the temperature of the SMA actuator wires 1-8. This is achieved by passing drive signals through the SMA actuator wires 1-8 that provide resistive heating. Heating is provided directly by the drive signals. Cooling is provided by reducing or ceasing the drive signal to allow the SMA actuator wires 1-8 to cool by conduction to its surroundings.

Two of the SMA actuator wires 1-8 are arranged on each of four sides around the primary axis P. The two of the SMA actuator wires 1-8 on each side, for example SMA actuator wires 1 and 2, are inclined in opposite senses with respect to each other, as viewed perpendicular from the primary axis P, and cross each other. The four sides on which the SMA actuator wires 1-8 are arranged extend in a loop around the primary axis P. In this example, the sides are perpendicular and so form a square as viewed along the primary axis P, but alternatively the sides could take a different quadrilateral shape. In this example, the SMA actuator wires 1-8 are parallel to the outer faces of the movable element 11, which conveniently packages the SMA actuation apparatus 10 but is not essential.

The two of the SMA actuator wires 1-8 on each side are connected to the movable element 11 and the support structure 12 to provide a force on the movable element 11 with a component in the same direction along the primary axis P, this alternating on successive sides. Thus the SMA actuator wires 1-4 on opposite sides form a group that provide a force in one direction (downwards in FIG. 1) and the SMA actuator wires 5-8 on the other opposite sides form a group that provide a force in the opposite direction (upwards in FIG. 1).

The SMA actuator wires 1-8 have a symmetrical arrangement in which lengths and inclination angles are the same, so that both the group of SMA actuator wires 1-4 and the group of SMA actuator wires 5-8 are each arranged with 2-fold rotational symmetry about the primary axis P. The group of SMA actuator wires 1-4 and the group of SMA actuator wires 5-8 are provided at the same position along the primary axis P.

As a result of this symmetrical arrangement, different combinations of the SMA actuator wires 1-8, when selectively actuated, are capable of driving movement of the movable element 11 with multiple degrees of freedom, as follows.

The group of SMA actuator wires 1-4 and the group of SMA actuator wires 5-8 when commonly actuated drive movement along the primary axis P.

Within each group, the SMA actuator wires on opposite sides (for example on one hand SMA actuator wires 1-2 and on the other hand SMA actuator wires 3-4) when differentially actuated drive tilting about a lateral axis perpendicular to the primary axis P. Tilting in any arbitrary direction may be achieved as a linear combination of tilts about the two lateral axes.

Within each group, the two SMA actuator wires that are parallel (for example on one hand SMA actuator wires 1 and 4 and on the other hand SMA actuator wires 2 and 3) when commonly actuated drive movement along a lateral axis perpendicular to the primary axis P. Movement in any arbitrary direction perpendicular to the primary axis P may be achieved as a linear combination of movements along the two lateral axes.

Except for the interconnection 13, the arrangement of the SMA actuation apparatus 10 shown in FIG. 1 is the same as the first arrangement of an SMA actuation apparatus described in WO-2011/104518, to which reference is made and which is incorporated herein by reference, but may instead be the same as any of the second to fifth arrangements of an SMA actuation apparatus described in WO-2011/104518. However these arrangements are not limitative, and in general the present invention may be applied to any SMA actuation system in which an arrangement of three or more SMA actuator wires mechanically connected between the support structure and the movable element are arranged on contraction thereof to drive displacement of the movable element relative to the support structure.

The control of the SMA actuator wires 1-8 will now be discussed further.

Figure 2:
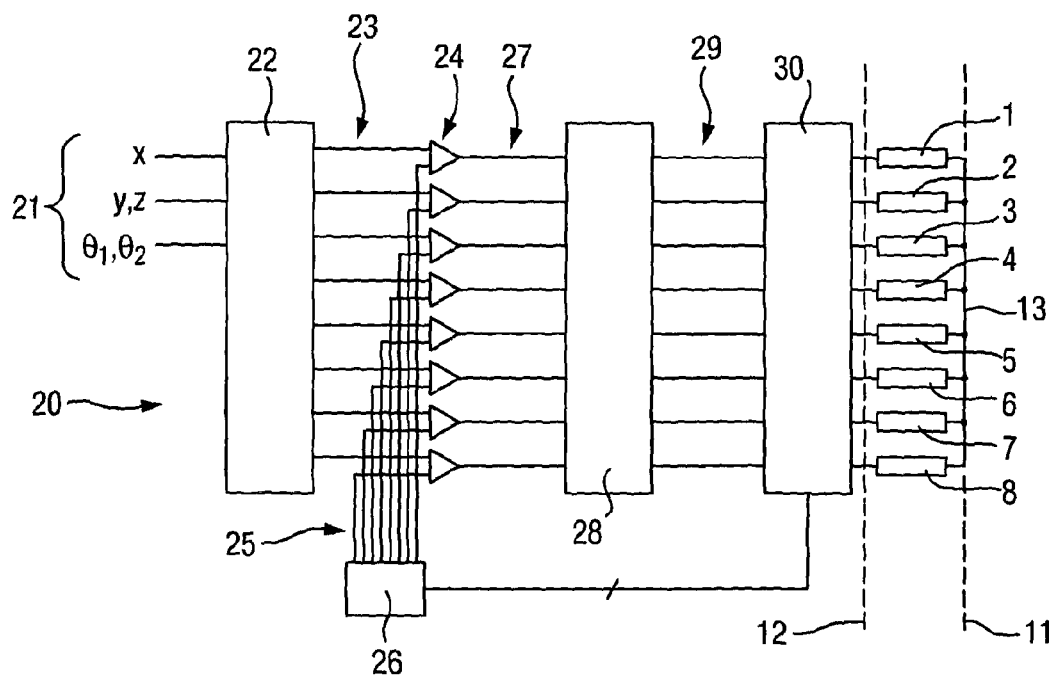
FIG. 2 is a diagram of a control circuit for the SMA actuation wires.

A control circuit 20 shown in FIG. 2 generates drive signals for each of the SMA actuator wires 1-8. The control circuit 20 derives the drive signals from the desired movement represented by movement signals 21. One movement signal 21 represents the desired movement x along the primary axis P. Another movement signal 21 represents the desired movements y, z along the lateral axes perpendicular to the primary axis P. Another movement signal 21 represents the desired tilts θ1, θ2.

The movement signals 21 are supplied to a matrix controller 22 that may be implemented in a processor or in hardware. The matrix controller 22 generates a target signal 23 for each of the SMA actuator wires 1-8 on the basis of the movement signals 21. Each target signal 23 represents a target resistance for a respective one of the SMA actuator wires 1-8. The matrix controller 22 uses a matrix calculation that relates the necessary contraction of each SMA actuator wire 1-8 to achieve movements with each of the degrees of freedom. Thus the matrix calculation represents the actual configuration of the SMA actuator wires 1-8 in the SMA actuation apparatus 10.

For movements with each of the degrees of freedom, there are sets of the SMA actuator wires 1-8 that on contraction drive movement in opposite directions, as detailed above for each of the first to fifth arrangements. The target signals 23 provide for differential contraction of those sets for each of the movement signals 21. Thus the target signals 23 for two sets of opposing SMA actuator wires in any of the degrees of freedom represented by one of the movement signals 21 are generated to provide a differential displacement in that degree of freedom. Effectively this means that the target signals 23 for those sets have a differential component that is representative of the demanded movement with that degree of freedom.

The differential components representing differential contractions of different sets of the SMA actuator wires 1-8 arising from movement with different degrees of freedom represented by different movement signals 21 may be combined. In this manner, any movement including any of the degrees may be translated into control signals for selectively actuating an appropriate combination of the SMA actuator wires 1-8.

These differential components may be modified by various compensation algorithms to compensate for non-linear effects such as hysteresis in the SMA material.

In addition, the target signals 23 include a common component that represents the desired stress in the SMA actuator wires 1-8. As respective SMA actuator wires 1-8 apply a stress to each other, this stress can be controlled by varying the heating of the SMA actuator wires 1-8. This provides active control of the stress cycle of the SMA actuator wires 1-8. The SMA actuation apparatus 10 is configured to develop a relatively high stress in the SMA actuator wires 1-8, whilst minimising the stress range. A high stress raises the temperature at which the stress in the SMA material is sufficient to cause contraction. The common component may therefore be varied in response to the ambient temperature, that itself may be determined by a temperature sensor (not shown) or from measured electrical parameters of the SMA actuator wires 1-8, being increased with increasing ambient temperature. Conversely, keeping the stress range small over a large change in strain has the advantage of minimising fatigue effects. Minimising the stress range also has the effect of minimising the drive power required to change the phase of the SMA material and allow it to contract.

Each target signal 23 is supplied to a respective error detector 24 that is also supplied with a resistance signal 25 from a resistance measurement circuit 26. The resistance signals 25 represent a measure of the resistance of respective ones of the SMA actuator wires 1-8, and are used as feedback parameters. The resistance measurement circuit 26 derives the resistance signals 25 as described further below.

Each error detector 24 detects an error signal 27, in respect of one of the SMA actuator wires 1-8, representing the error between the target resistance represented by the target signal 23 for that SMA actuator wire 1-8 and the measure of resistance represented by the resistance signal 25 for that SMA actuator wire 1-8.

The error detectors 24 supply the error signals 27 to a control unit 28. On the basis of the error signals 27, the control unit 28 generates control signals 29 for a drive circuit 30 that represent drive signals that are to be supplied through the SMA actuator wires 1-8. The drive circuit 30 supplies the drive signals represented by the control signals 29 through the SMA actuator wires 1-8.

As the drive circuit 30 is connected to the SMA actuator wires 1-8 at the support structure and the SMA actuator wires 1-8 are connected together at the movable element 12 by the interconnection 13, the drive signals are supplied through different combinations of SMA actuator wires 1-8 on each side of the interconnection 13. In particular, the drive signals are supplied to and from the interconnection 13 through different SMA actuator wires 1. For each combination of SMA actuator wires 1-8 used, the drive signals are supplied as pulse-width modulation (PWM) signals.

Depending on the selected combination, different SMA actuator wires 1-8 experience drive signals of different powers that therefore cause different degrees of heating in individual SMA actuator wires.

In one example, the drive signals are supplied selectively through eight different combinations that each consist of one 1 of the SMA actuator wires 1-8 on one side of the interconnection 13 and plural, other SMA actuator wires 2-8, preferably all of the remaining SMA actuator wires 2-8, in parallel on the other side of the interconnection 13. In this case, the one SMA actuator wire 1 is heated predominantly, because the plural other SMA actuator wires 2-8 are arranged in parallel.

In particular, the current flowing through the one of the SMA actuator wire 1 on one side of the interconnection 13 is split between the other SMA actuator wires 1-8 on the other side of the interconnection 13. This means that the current flowing the other SMA actuator wires 2-8 is 1/7 of the current flowing through the one SMA actuator wire 1. Similarly, the voltage across the other SMA actuator wires 2-8 is reduced because their overall resistance is reduced by their parallel arrangement. This means that the voltage across the other SMA actuator wires 2-8 is 1/7 of the voltage across the one SMA actuator wire 1. These two factors in combination mean that the power generated in the other SMA actuator wires 2-8 is 1/49 (or more generally $1/(n-1)^2$, where n is the number of SMA actuator wires through which the drive signal flows in parallel) of the power generated in the one SMA actuator wire 1.

The control unit 28 outputs control signals 29 that select different combinations of SMA actuator wires 1-8 and the PWM duty cycle to vary the heating of individual SMA actuator wires 1-8 in accordance with the error signals 27. Thus the resistance measured by the resistance measurement circuit 26 is used as a feedback signal in a closed-loop control algorithm to control the heating of individual SMA actuator wires 1-8 to meet the demand represented by the target signals 23 derived from the movement signals 21. The closed-loop control may be proportional, or may implement more complicated control algorithms, for example proportional-integral.

By using the electrical resistance of the SMA actuator wire 1 as a feedback parameter that relates to position, over the functional movement range the contraction and expansion of the SMA material is approximately linear with its electrical resistance. Non-linearities, including hysteresis and creep, occur to some extent. These may be ignored, but for better linearity, these may be accounted for in the closed-loop control algorithm.

The different combinations of SMA actuator wires 1-8 are selected to control which SMA actuator wires 1-8 are heated.

Figure 4:
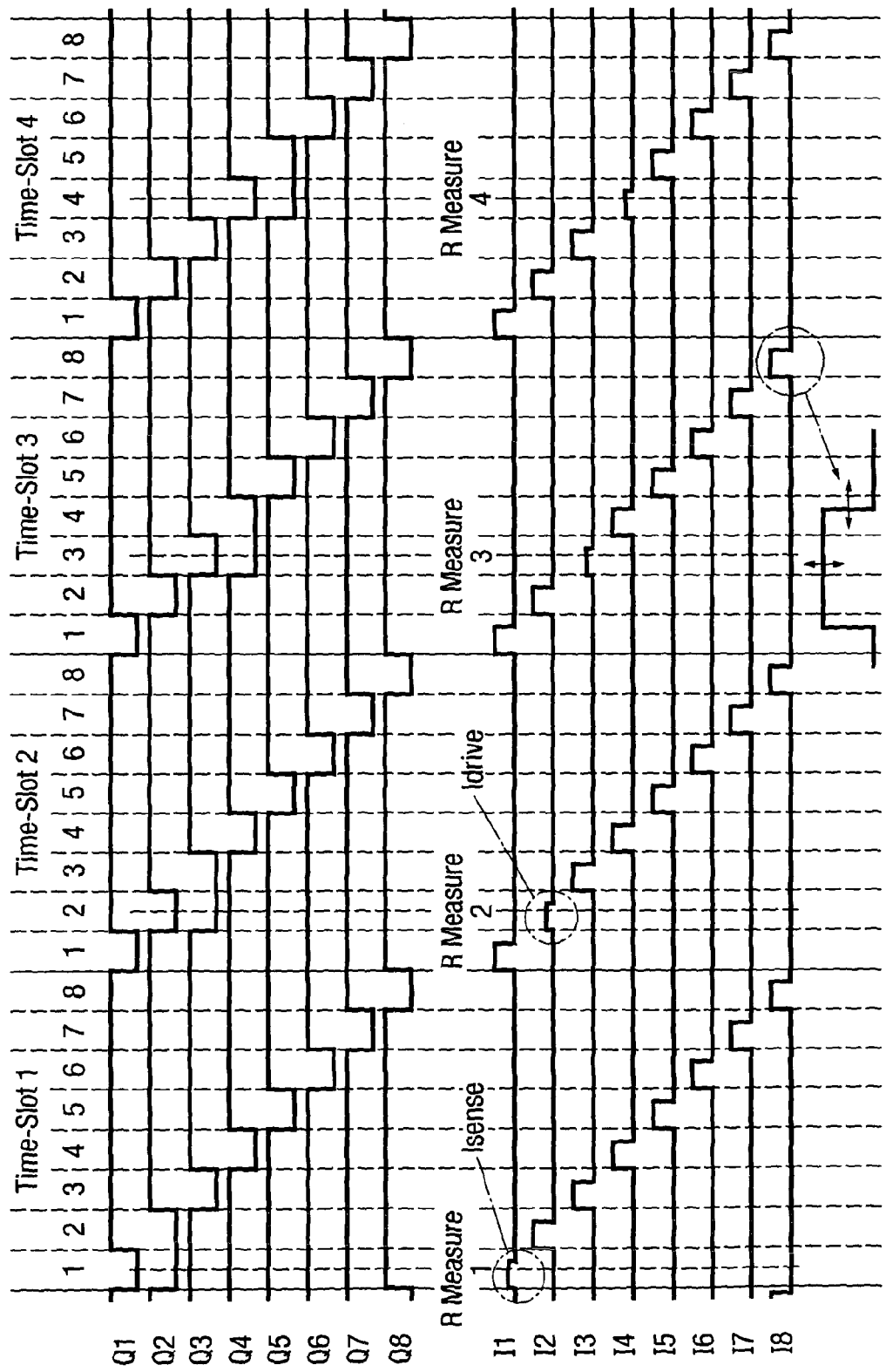
FIGS. 4 and 5 are timing diagrams of two schemes for the control signals supplied to the first configuration of the drive circuit.
Figure 5:
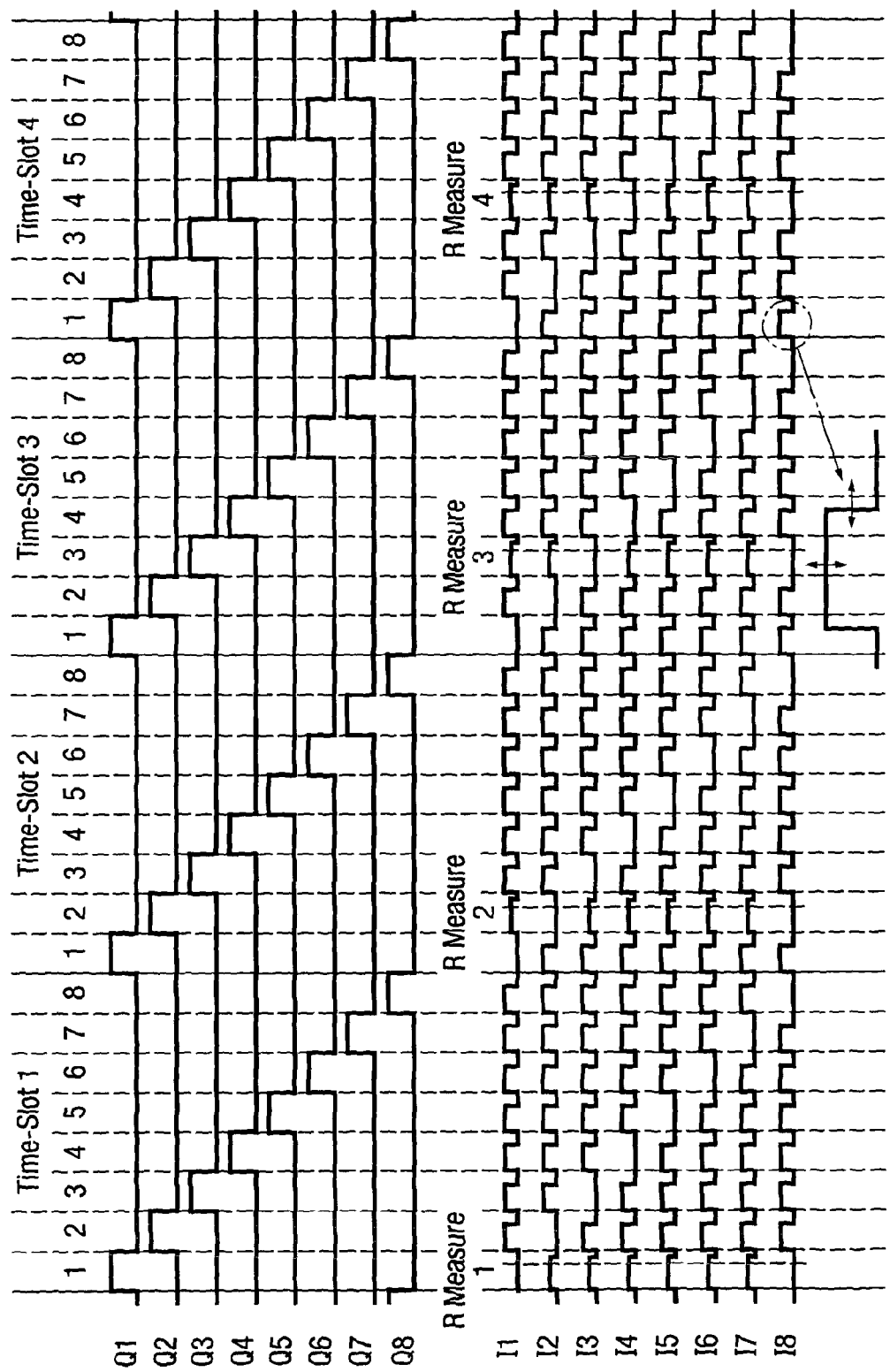
Figure 10:
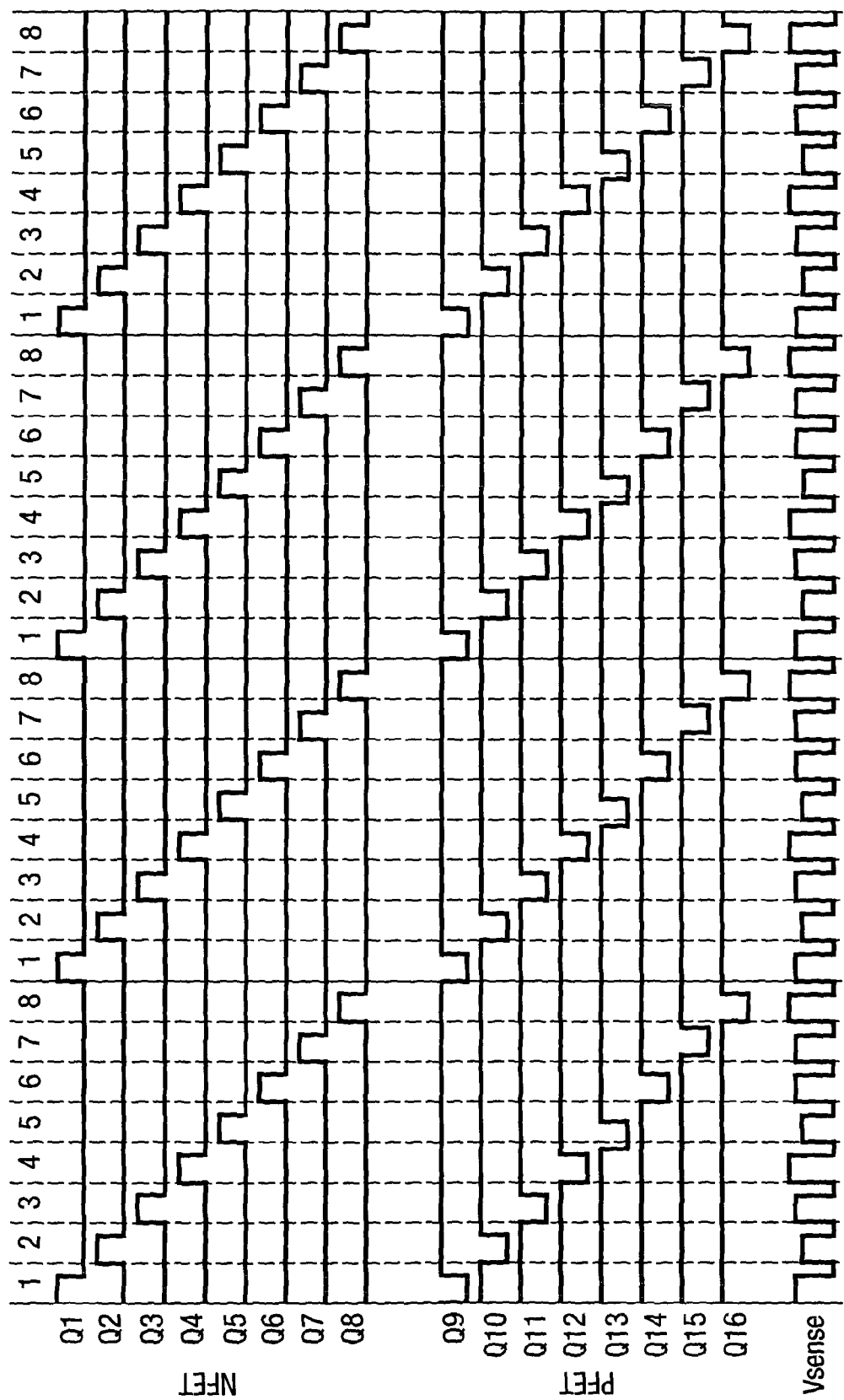
FIG. 10 is a timing diagram of a scheme for the control signals supplied to the fifth configuration of the drive circuit.

In the above example where the combinations are each one 1 of the SMA actuator wires 1-8 on one side of the interconnection 13 and all the other SMA actuator wires 2-8 on the other side of the interconnection, one control algorithm implemented by the control circuit 28 is to supply, through each SMA actuator wire 1-8 in turn as the one SMA actuator wire, a drive signal selected solely in accordance with the error signal 27 for that SMA actuator wire 1-8. That drive signal is also passed through the parallel combination of the other SMA actuator wires 1-8, but the heating caused thereby is relatively small and may be considered as mere crosstalk. Timing diagrams illustrating example implementations of such a control algorithm for some of the configurations of the control circuit 30 are shown in FIGS. 4, 5 and 10 and are described below. Alternatively, more complicated control algorithms that take account of all the error signals 27 may be used.

Although in this example the drive signals are supplied selectively through one 1 of the SMA actuator wires 1-8 on one side of the interconnection 13, in other examples the drive signals may be supplied through different parallel combinations of SMA actuator wires 1-8 on both sides of the interconnection 13. In general, the combinations and the PWM duty cycle may be selected on the basis of the set of error signals 27 as a whole.

Six alternative configurations of the drive circuit 30 will now be described with reference to FIGS. 3 to 10. These configurations are not limitative, but serve to illustrate how the control signals 29 generate drive signals in different combinations of the SMA actuator wires 1-8 on each side of the interconnection 13, and further how the resistance measurement circuit 26 derives resistance signals 25 representing a measure of the resistances of individual SMA actuator wires 1-8.

Some of the configurations of the drive circuit 30 utilise common elements that are given common reference numerals and are arranged as follows.

In each configuration, the SMA actuator wires 1-8 are connected at the movable element 11 to the interconnection 13 and at the support structure 12 to the drive circuit 30. The resistances R1-R8 are the resistances of the SMA actuator wires 1-8. In the following, the symbol // is used to represent a parallel resistance. For example, R1//R2 represents the resistance of R1 and R2 in parallel etc.

The currents I1-I8 are the currents flowing through the respective SMA actuator wires 1-8.

The voltages V1-V8 are the voltages at the ends of the respective SMA actuator wires 1-8 at the support structure 12. In several of the configurations, the voltages V1-V8 are measured by the resistance measurement circuit 26. In other embodiments, currents across the SMA actuator wires 1-8 are measured by the resistance measurement circuit 26.

In each configuration, the drive circuit 30 includes positive and negative supply rails Vcc and GND between which the elements of the drive circuit 30 are arranged.

In the different configurations, the currents I1-I8 and voltages V1-V8 are controlled by various combinations of (a) current sources S1-S8 connected to the ends of the respective SMA actuator wires 1-8, and/or (b) switch devices Q1-Q8 connected to the ends of the respective SMA actuator wires 1-8. The current sources S1-S8 and switch devices Q1-Q8, where present, are controlled by the control signals 29.

The current sources S1-S8, where present, supply currents I1-I8 of a predetermined current value. They may be implemented by any conventional type of current source having suitably high output impedance. In some of the configurations, the use of currents of a predetermined current value allows the voltages V1-V8 measured by the resistance measurement circuit 26 to form measures of resistance because the current has a known value.

The switch devices Q1-Q8, where present, may be implemented by any suitable switching device, for example a FET (field-effect transistor) such as a MOSFET (metal-oxide-semiconductor field-effect transistor).

Figure 3:
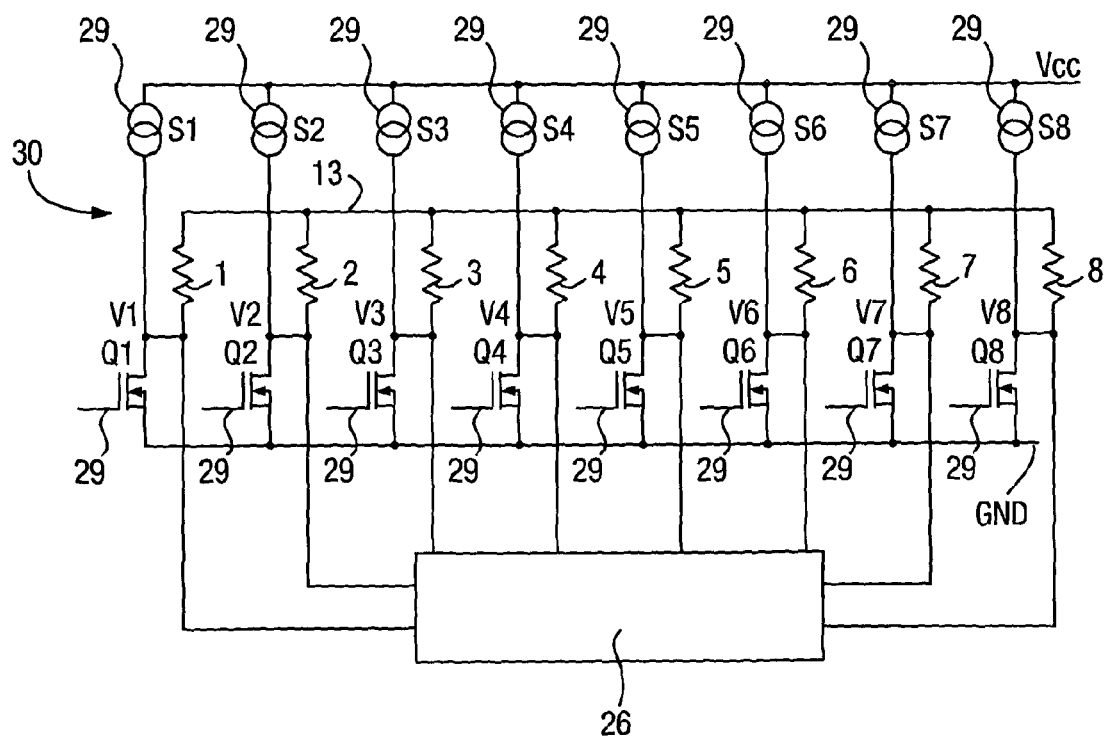
FIG. 3 is a diagram of a first configuration of the drive circuit of the control circuit.

The first configuration of the drive circuit 30 is shown in FIG. 3. In this configuration, current sources S1-S8 are connected between the positive supply rail Vcc and the ends of the respective SMA actuator wires 1-8, and switch devices Q1-Q8 are connected between the negative supply rail GND and the ends of the respective SMA actuator wires 1-8.

FIG. 4 is a timing diagram of a first scheme for the control signals 29 supplied to the first configuration of the drive circuit 30, using a time-division multiplexing. In FIG. 4, the top 8 traces show the control signals 29 supplied to the switch devices Q1-Q8 and the bottom 8 traces show the control signals 29 supplied to the current sources S1-S8. In particular, a high level turns the respective switch device Q1-Q8 or current source S1-S8 on and a low level turns the respective switch device Q1-Q8 or current source S1-S8 off.

FIG. 4 shows a typical approach to supplying drive signals into the SMA actuator wires 1-8 whilst resistance measurements are interleaved. In particular, the control signals 29 are applied in a series of time-slots each subdivided into sub-slots T1 to T8. For clarity, FIG. 4 only shows the first 4 time-slots of each 8 time-slot cycle.

Each time-slot is divided into 8 sub-slots T1 to T8 during which one of the SMA actuator wires 1-8 is heated predominantly in turn. The resistance of a different one of the SMA actuator wires 1-8 is measured in one of the sub-slots T1-T8 of each time slot.

In each sub-slot T1-T8, a single current source S1-S8 connected to one of the SMA actuator wires 1-8 is turned on, and the switch device Q1-Q8 connected to that one of the SMA actuator wires 1-8 is turned off. In one sub-slot in each time slot, one further switch device Q1-Q8 is turned off, the switch devices Q1-Q8 connected to all the other SMA actuator wires 1-8 are turned on. For example in sub-slot T1 of the first time slot, only current source S1 is on, switch devices Q1 and Q2 are off and switch devices Q3-Q8 are on. In the other sub-slots of each time slot, switch devices connected to all the other SMA actuators are turned on. For example in sub-slot T2 of the first time slot, only current source S2 is on, switch drive Q2 is off and switch devices Q1, Q3-Q8 are on.

As a result, in one sub-slot T1-T8, a drive signal is supplied through one of the SMA actuator wires on one side of the interconnection 13 and all but one of the other SMA actuator wires in parallel on the other side of the interconnection 13. Thus one SMA actuator wire is heated predominantly in each sub-slot T1-T8 and in the other sub-slots a drive signal is supplied through one of the SMA actuator wires 1-8 on one side of the interconnection 13 and all the other SMA actuator wires in parallel on the other side of the interconnection 13. For example in sub-slot T1 of the first time slot, a drive signal is supplied through SMA actuator wire 1 on one side of the interconnection 13 and SMA actuator wires S3-S8 (not SMA actuator wire S2) in parallel on the other side of the interconnection 13 and in sub-slot T2 of the first time slot, a drive signal is supplied through SMA actuator wire 2 and SMA actuator wires 1, 3-8 in parallel.

As shown in the inset in FIG. 4, within each one of the sub-slots T1-T8, the PWM duty cycle of the current source S1-S8 is varied in accordance with the error signal 27 in respect of the one of the SMA actuator wires 1-8 that is being heated predominantly. For example in sub-slot T1, the PWM duty cycle is varied in accordance with the measure of resistance of SMA actuator wire 1. In this manner, the heating of each one of the SMA actuator wires 1-8 in their respective sub-slots T1-T8 is varied using its measured resistance as a feedback signal in a closed-loop control loop.

Optionally, it is also possible to adjust the amplitude of the current pulses as a further means of controlling power delivered to the wires. This is typically useful at high temperature operation where it is necessary to deliver less power to the load yet still measure resistance.

Within this closed-loop control, one possibility is to ignore the heating that occurs in the SMA actuator wires when connected in parallel as mere cross-talk. Another possibility is for the control circuit to derive a measure of the heating that occurs in the SMA actuator wires when connected in parallel, from their resistance that is known and the current of the drive signal that is known. Then, this heating can be taken into account by reducing the PWM duty cycle accordingly.

In the sub-slots T1-T8 of each time slot in which two switch devices are turned off, the resistance measurement circuit 26 derives a measure of resistance for the one of the SMA actuator wires 1-8 that is heated predominantly from the measurements of the voltages of that one of the SMA actuator wires 1-8 and the further SMA actuator wire 1-8 whose switch device Q1-Q8 is turned off. For example in sub-slot T1, a measure of resistance for the SMA actuator wire 1 is derived from measurements of the voltages V1 and V2. As no signal is supplied through the further SMA actuator wire (for example SMA actuator wire S2 in sub-slot T1), the voltage of the end of that further SMA actuator wire at the support structure 12 follows the voltage at the interconnection 13 at the movable element 11. Accordingly, the voltage across the one of the SMA actuator wires 1-8 that is heated predominantly is the difference between the two measured voltages (for example V1-V2 in sub-slot T1). As the currents I1-I8 supplied by the current sources S1-S8 are of a predetermined value, the measured voltage is a measure of the resistance of that one of the SMA actuator wires 1-8.

Optionally, the drive current during the one of the sub-slots T1-T8 in which resistance is measured may be reduced, which gives greater accuracy, but is not essential.

An alternative modification of the first scheme shown in the timing diagram of FIG. 4 is as follows.

In this modification, in each sub-slot T1-T8, only the switch device Q1-Q8 connected to the one of the SMA actuator wires 1-8 is turned on whilst the switch devices Q1-Q8 connected to all the other SMA actuator wires 1-8 are turned off. As a result, in each time slot, a drive signal is supplied through one of the SMA actuator wires on one side of the interconnection 13 and all the other SMA actuator wires in parallel on the other side of the interconnection 13. The one SMA actuator wire is heated predominantly, as described above. For example in sub-slot T1, only current source S1 is on, switch device Q1 is off and switch devices Q2-Q8 are on and so a drive signal is supplied through SMA actuator wire 1 on one side of the interconnection 13 and SMA actuator wires S2-S8 in parallel on the other side of the interconnection 13.

Within each one of the sub-slots T1-T8, the PWM duty cycle is varied as described above. However, the resistance measurement circuit 26 derives measures of resistance for each SMA actuator wire 1-8 as a function of the measurements of the voltages V1-V8 in each sub-slot T1-T8.

In each sub-slot T1-T8, the overall resistance of the network formed by the SMA actuator wires 1-8 is the sum of (1) the resistance of the one of the SMA actuator wires on one side of the interconnection 13 and (2) the parallel resistance of the other SMA actuator wires on the other side of the interconnection 13. For example, in sub-slot T1, the overall resistance is equal to R1+R2//R3//R4//R5//R6//R7//R8, which is a function of the resistances R1-R8.

The voltage across the overall network formed by the SMA actuator wires 1-8 is measured in each sub-slot T1-T8. For example, in sub-slot T1, the voltage V1 is measured being the voltage across the overall network (which assumes a zero voltage drop across the open switch devices Q2-Q8, but for more accuracy the voltage V1-V2 could be measured). As the currents I1-I8 supplied by the current sources S1-S8 are of a predetermined value, the measured voltage is a measure of the overall resistance.

The measures of the overall resistance (represented by the measured voltage) in each sub-slot T1-T8 are different functions of the combination of the resistances R1-R8. Therefore, the resistance measurement circuit 26 derives measures of resistance for each SMA actuator wire 1-8 as a function of the measures of the overall resistance taken in the set of sub-slots T1-T8.

The combination of measurements may be performed in an iterative manner, wherein in each sub-slot T1-T8 there is derived an updated measure of resistance of the SMA actuator wire 1-8 being predominantly heated in that sub-slot, using the measures of resistance for the other SMA actuator wires derived in previous sub-slots T1-T8 from previous measurements. For example in sub-slot T8, the updated measure of the resistance R8 of SMA actuator wire 8 is derived the equation $$R8 = V8/I8 - 1/(1/R1 + 1/R2 + 1/R3 + 1/R4 + 1/R5 + 1/R6 + 1/R7),$$

where I8 has a predetermined value and R2, R3, R4, R5, R6, R7 and R8 are values derived in earlier sub-slots. Since each of R2, R3, R4, R5, R6, R7 and R8 have a small effect on the value of R1, the error in R1 will be smaller than the error in R2, R3, R4, R5, R6, R7 and R8. This means that if this calculation is performed sequentially for each SMA actuator wire 1-8 and then this process is repeated, an accurate value of the measure of resistance R1-R8 of each SMA actuator wire 1-8 can be obtained.

FIG. 5 is a timing diagram of a second scheme for the control signals 29 supplied to the first configuration of the drive circuit 30, using time-division multiplexing. In FIG. 4a, the top 8 traces show the control signals 29 supplied to the switch devices Q1-Q8 and the bottom 8 traces show the control signals 29 supplied to the current sources S1-S8. In particular, a high level turns the respective switch device Q1-Q8 or current source S1-S8 on and a low level turns the respective switch device Q1-Q8 or current source S1-S8 off.

FIG. 5 shows another approach to supplying drive signals into the SMA actuator wires 1-8 whilst resistance measurements are interleaved. In particular, the control signals 29 are applied in a series of time-slots each subdivided into sub-slots T1 to T8. For clarity, FIG. 5 only shows the first 4 time-slots of each 8 time-slot cycle.

Each time-slot is divided into 8 sub-slots T1 to T8 during which one of the SMA actuator wires 1-8 is heated predominantly in turn and the resistance of that one of the SMA actuator wires 1-8 is measured.

In each sub-slot T1-T8, a single switch device Q1-Q8 connected to one of the SMA actuator wires 1-8 is turned on. For example in sub-slot T1-T8, switch devices Q1-Q8, respectively, are on alone. In most sub-slots T1-T8, the current source S1-S8 connected to that one of the SMA actuator wires 1-8 is turned off, and all the other current sources S1-S8 are turned on. For example, in sub-slots T2-T8 of the first time slot, the current sources S2-S8, respectively, are off, and all the other current sources S1-S8 are turned on. However, in one sub-slot T1-T8 in each time slot, a further current source is turned off. For example in sub-slot T1 of the first time slot, current sources S1 and S8 are turned off, but current sources S2-S7 are turned on and in sub-slot T2 of the second time slot, current sources S2 and S8 are turned off, but current sources S1, S3-S7 are turned on.

As a result, in each sub-slot T1-T8, a drive signal is supplied through one of the SMA actuator wires on one side of the interconnection 13 and all but one of the other SMA actuator wires in parallel on the other side of the interconnection 13. Thus one SMA actuator wire is heated predominantly in each sub-slot T1-T8. For example, in sub-slot T1 of the first time slot, a drive signal is supplied through SMA actuator wire 1 on one side of the interconnection 13 and SMA actuator wires S2-S7 (not SMA actuator wire S8) in parallel on the other side of the interconnection 13, and in sub-slot T2 of the first time slot, a drive signal is supplied through SMA actuator wire 2 on one side of the interconnection 13 and SMA actuator wires S1, S3-S7 in parallel on the other side of the interconnection 13.

As shown in the inset in FIG. 5, within each one of the sub-slots T1-T8, the PWM duty cycle of the current sources S1-S8 is varied in accordance with the error signal 27 in respect of the one of the SMA actuator wires 1-8 that is being heated predominantly. For example in sub-slot T1, the PWM duty cycle is varied in accordance with the measure of resistance of SMA actuator wire 1. In this manner, the heating of each one of the SMA actuator wires 1-8 in their respective sub-slots T1-T8 is varied using its measured resistance as a feedback signal in a closed-loop control loop.

Within this closed-loop control, one possibility is to ignore the heating that occurs in the SMA actuator wires when connected in parallel as mere cross-talk. Another possibility is for the control circuit to derive a measure of the heating that occurs in the SMA actuator wires when connected in parallel, from their resistance that is known and the current of the drive signal that is known. Then, this heating can be taken into account by reducing the PWM duty cycle accordingly.

In the sub-slot T1-T8 of each time slot where a further switch device is turned off, the resistance measurement circuit 26 derives a measure of resistance for the one of the SMA actuator wires 1-8 that is heated predominantly from the measurements of the voltages of that one of the SMA actuator wires 1-8 and the further SMA actuator wire 1-8 whose current source S1-S8 is turned off. For example in sub-slot T1 of the first time slot, a measure of resistance for the SMA actuator wire 1 is derived from measurements of the voltages V1 and V8. As no signal is supplied through the further SMA actuator wire (for example SMA actuator wire S8 in sub-slot T1), the voltage of the end of that further SMA actuator wire at the support structure 12 follows the voltage at the interconnection 13 at the movable element 11. Accordingly, the voltage across the one of the SMA actuator wires 1-8 that is heated predominantly is the difference between the two measured voltages (for example V1-V2 in sub-slot T1). As the currents I1-I8 supplied by the current sources S1-S8 are of a predetermined value, the measured voltage is a measure of the resistance of that one of the SMA actuator wires 1-8.

The advantage of the second scheme over the first scheme is that due six of the current sources S1 to S8 supplying current in parallel, the current requirement for a single one of the current sources S1 to S8 is reduced which reduces their cost.

The second scheme may be modified in the same way as the first scheme so that only one current source is turned off in each sub-slot T1-T8 and measures of resistance are derived for each SMA actuator wire 1-8 as a function of the measurements of the voltages V1-V8 in each sub-slot T1-T8.

The timing diagram shown in FIGS. 4 and 5 are not limitative and there are alternative approaches to modulating the current sources S1-S8 and switch devices Q1-Q8. One approach would be to modulate the width of the switch devices Q1-Q8 and to turn the current source on for the whole phase. This may offer improved switching performance as practical current sources will switch slower than practical switch devices.

Figure 6:
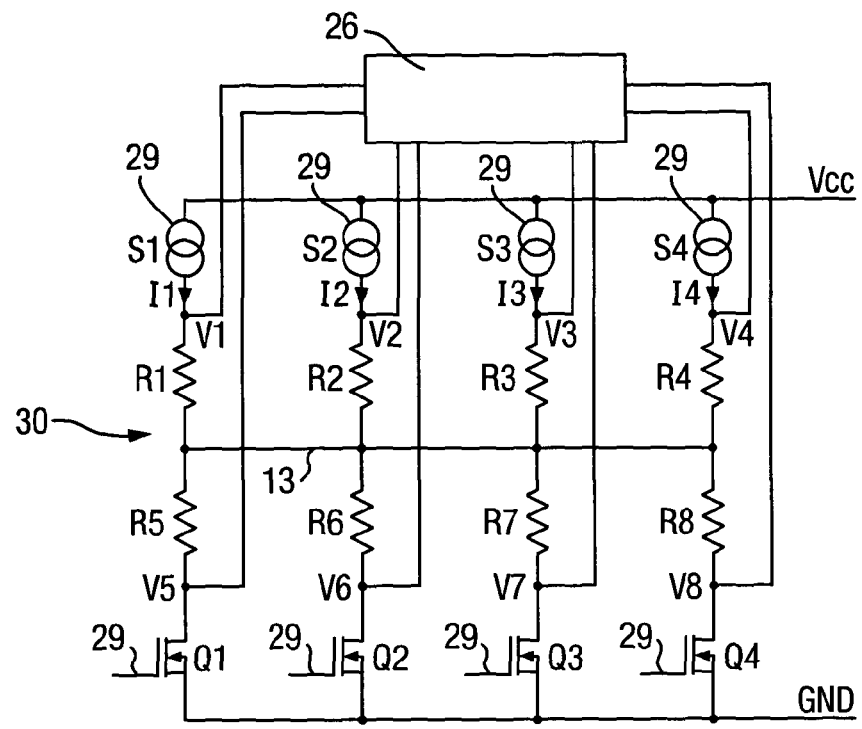
FIGS. 6 to 9 are diagrams of second to fifth configurations of the drive circuit of the control circuit.

The second configuration of the drive circuit 30 is shown in FIG. 6. In this configuration, current sources S1-S4 are connected between the positive supply rail Vcc and the ends of four of the SMA actuator wires 1-4, and switch devices Q5-Q8 are connected between the negative supply rail GND and the ends of the other four SMA actuator wires 5-8. In this case, the drive signals are passed through different combinations of (1) the SMA actuator wires 1-4 on one side of the interconnection 13 and (2) the other four SMA actuator wires 5-8 on the other side of the interconnection 13. The control signals 29 are supplied to the second configuration of the drive circuit 30, using time-division multiplexing in a similar manner to the first configuration except that the drive signal passes through a maximum of four SMA actuator wires in parallel, that is either the four SMA actuator wires 1-4 or the other four SMA actuator wires 5-8.

Figure 7:
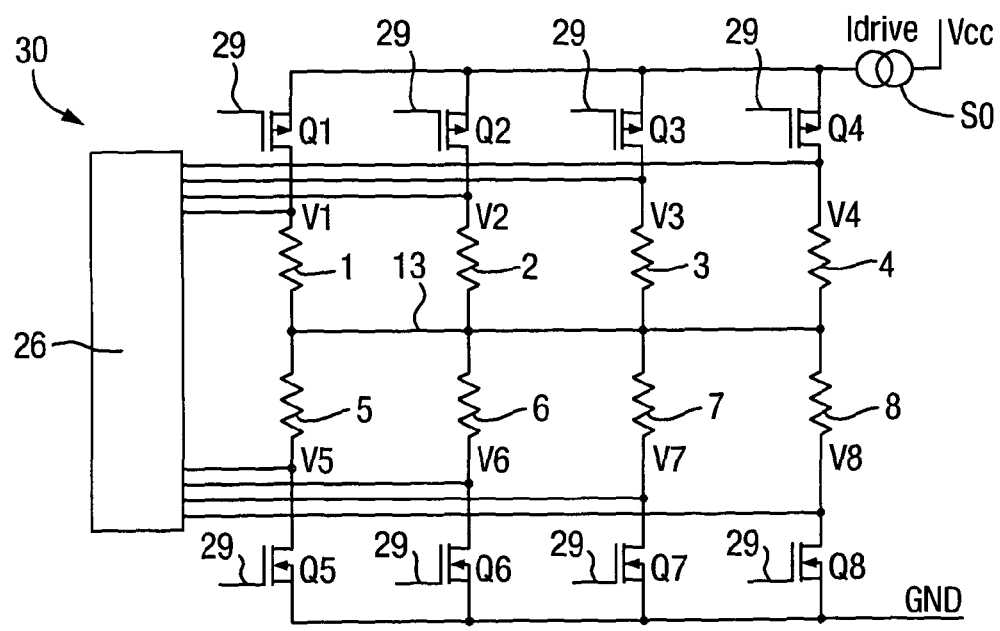

The third configuration of the drive circuit 30 is shown in FIG. 7. In this configuration, switch devices Q1-Q4 are connected between a common current source S0, itself connected to the positive supply rail Vcc, and the ends of four of the SMA actuator wires 1-4, and switch devices Q5-Q8 are connected between the negative supply rail GND and the ends of the other four SMA actuator wires 5-8. In this case, the drive signals are passed through different combinations of (1) the SMA actuator wires 1-4 on one side of the interconnection 13 and (2) the other four SMA actuator wires 5-8 on the other side of the interconnection 13. The control signals 29 are supplied to the third configuration of the drive circuit 30, using time-division multiplexing in a similar manner to the first configuration except that the drive signal passes through a maximum of four SMA actuator wires in parallel, that is either the four SMA actuator wires 1-4 or the other four SMA actuator wires 5-8.

Figure 8:
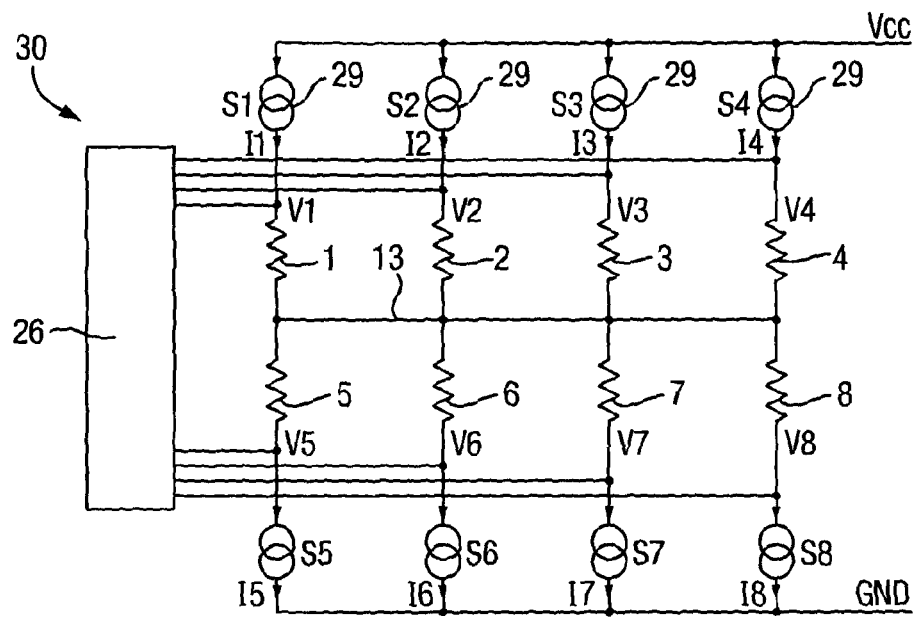

The fourth configuration of the drive circuit 30 is shown in FIG. 8. In this configuration, current sources S1-S4 are connected between the positive supply rail Vcc and the ends of four of the SMA actuator wires 1-4, and current sources S5-S8 are connected between the negative supply rail GND and the ends of the other four SMA actuator wires 5-8. In this case, the drive signals are passed through different combinations of (1) the SMA actuator wires 1-4 on one side of the interconnection 13 and (2) the other four SMA actuator wires 5-8 on the other side of the interconnection 13. The control signals 29 are supplied to the fourth configuration of the drive circuit 30, using time-division multiplexing in a similar manner to the first configuration except that the drive signal passes through a maximum of four SMA actuator wires in parallel, that is either the SMA actuator wires 1-4 or the other four SMA actuator wires 5-8.

Figure 9:
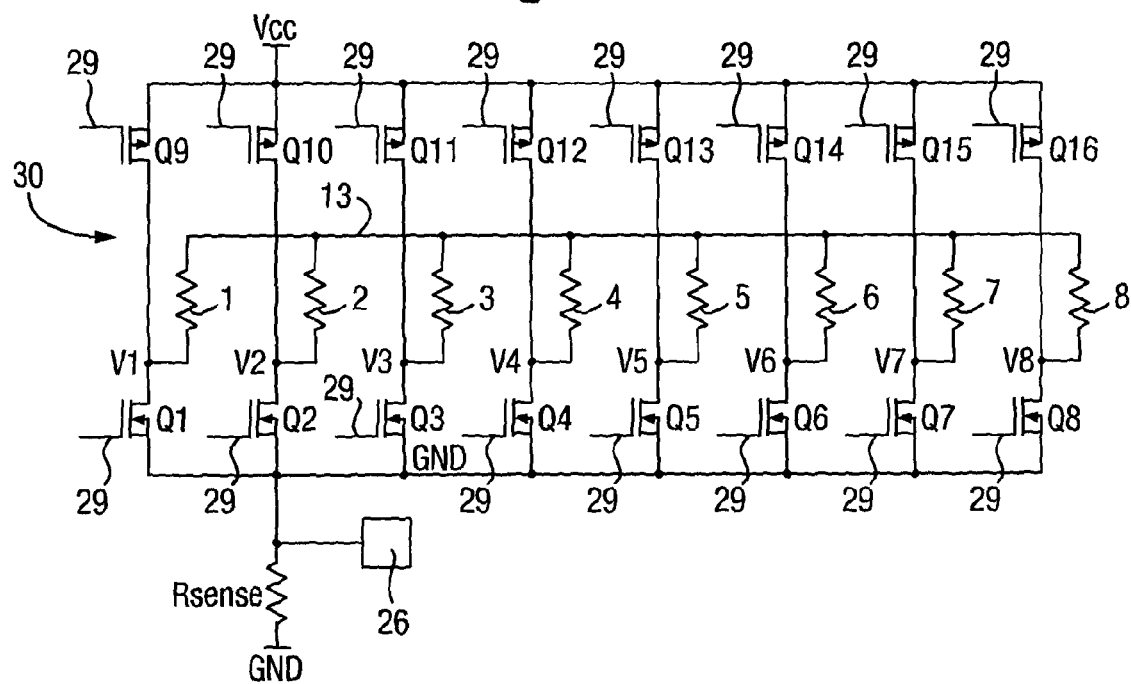

The fifth configuration of the drive circuit 30 is shown in FIG. 9. In this configuration, the drive signals have a predetermined voltage value, and the resistance measurement circuit 26 make measurements of the current through the SMA actuator wires 1-8 to provide a measure of resistance. In particular, switch devices Q1-Q8 are connected between a sense resistor Rsense, itself connected to the negative supply rail GND, and the ends of the SMA actuator wires 1-8, and in addition further switch devices Q9-Q16 are connected between the positive supply rail Vcc and the ends of the SMA actuator wires 1-8. The resistance measurement circuit 26 measures the voltage across the resistor Rsense which is a measure of the current flowing through the resistor Rsense and hence through the SMA actuator wires 1-8.

The switch devices Q1-Q8 and further switch devices Q9-Q16 are controlled in the same manner as the switch devices Q1-Q8 and current sources S1-S8 in the first configuration. This causes the same operation as described above for the first configuration except that the drive signals are of a predetermined voltage value (i.e. the difference in voltage between the positive and negative supply rails Vcc and GND), rather than a predetermined current value. Accordingly, the resistance measurement circuit 26, instead of making measurements of the voltages V1-V5, makes measurements of the current across the SMA actuator wires 1-8. The measured current represents the overall resistance of the group of SMA actuator wires 1-8.

FIG. 10 is a timing diagram of a scheme for the control signals 29 supplied to the fifth configuration of the drive circuit 30, using time-division multiplexing. In FIG. 10, the top 8 traces show the control signals 29 supplied to the switch devices Q1-Q8 and the bottom 8 traces show the control signals 29 supplied to the switch devices Q9-Q16. In particular, a high level turns the respective switch device Q1-Q16 on and a low level turns the respective switch device Q1-Q16 off. In accordance with the timing diagram, drive signals are supplied through the same combinations of SMA actuator wires 1-8 as the alternative modification of the first scheme. Accordingly, the resistance measurement circuit 26 derives measures of resistance for each SMA actuator wire 1-8 as a function of the measurements of the current in each sub-slot T1-T8, in the same manner as the alternative modification of the first scheme described above.

For a higher degree of accuracy the resistance detection circuit 26 may measure both voltages and currents across the SMA actuator wires 1-8 and derive a measure of resistance as the ratio thereof.

Any of these configurations, or indeed other configurations, of the drive circuit 30 may be selected according to a trade-off between cost and performance.

In the above-described embodiments, all of the SMA actuator wires 1-8 are electrically connected at the interconnection 13 at the moving element 11. Similar techniques may be applied if any one or more groups of three or more of the SMA actuator wires 1-8 are electrically connected at the moving element 11.

The SMA actuation apparatus 10 may be used to provide positional control of a wide range of types of movable element 11. Some non-limitative examples in which the SMA actuation apparatus 10 is a camera apparatus will now be described. These examples are described in more detail in WO-2011/104518, the disclosure of which may also be applied to the SMA actuation apparatus 10 and which is incorporated herein by reference.

Figure 11:
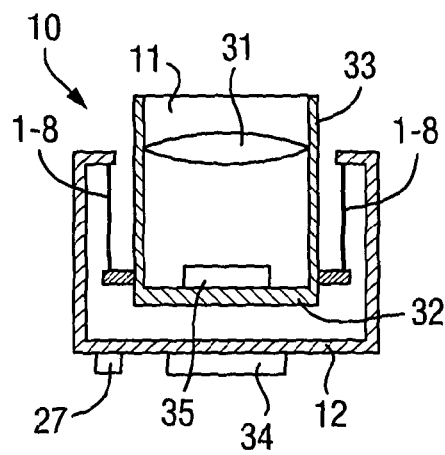
FIG. 11 is a schematic cross sectional view of an SMA actuation apparatus that is a camera apparatus providing OIS.

In a first example, the SMA actuation apparatus 10 is a camera apparatus arranged to perform OIS as shown schematically in FIG. 11 which is a cross-sectional view, the cross-section being taken along the primary axis P that is the optical axis of the camera apparatus. The camera apparatus is to be incorporated in a portable electronic device such as a mobile telephone, media player or portable digital assistant. Thus miniaturisation is an important design criterion.

The movable element 11 is a camera unit that is a functional camera and comprises an image sensor 35 and a camera lens element 31, and the support structure 12 is a camera support on which there is an IC (integrated circuit) chip 34 in which the control circuit 20 is implemented.

The movable element 11 has a printed Circuit board (PCB) 32 on its bottom surface to which the image sensor 35 is mounted and connected. The camera lens element 31 is supported by a can 33 on the PCB 32 and arranged to focus an image onto the image sensor 35. The image sensor 35 captures the image and may be of any suitable type for example a CCD (charge-coupled device) or a CMOS (complimentary metal-oxide-semiconductor) device. The camera unit is a miniature camera in which the camera lens element 31 has one or more lenses with a diameter of at most 10 mm.

As described further below, OIS is provided by moving the entire movable element 11 with the advantage that the internal construction of the camera unit need not be adapted for this purpose. Thus, the camera unit may be a functionally standard camera and may have any desired construction to provide the desired optical performance, irrespective of the OIS function, for example comprising a single lens or plural lenses and providing a fixed focus or a variable focus.

In this example, OIS is provided by tilting the movable element 11, but also by moving the movable element 11 along lateral axes perpendicular to the primary axis P that is the optical axis. Thus the SMA actuation apparatus provides advantages over a camera providing OIS solely by tilting. This is based on a recognition that an OIS system for miniature cameras will be used in a different manner to that used for larger digital stills cameras. Therefore, it is advantageous to compensate for tilts in three orthogonal axes (including the optical axis), rather than the normal two. The SMA actuation apparatus 10 makes use of this finding to provide an actuator arrangement capable of actively compensating for dynamic tilt of the camera in three orthogonal axes.

In this case, the control circuit 20 of the SMA actuation apparatus 10 is adapted to include a gyroscope sensor 27 that outputs a signal representative of the angular velocity of the support structure 12, thereby acting as a vibration sensor that detects the vibrations that SMA actuation apparatus 10 is experiencing. The control circuit 20 analyses the output signals from the gyroscope sensor 27 to derive the movement signals 21 that represent the movement of the movable element 11 needed to compensate for the movement of the SMA actuation apparatus 10 as a whole. In general, this includes movement signals 21 representing desired tilts $\theta 1$, $\theta 2$ and representing desired movements y, z along the lateral axes perpendicular to the primary axis P. In this example, no movement along the primary axis P is needed, so the movement signals 21 representing the desired movement x along the primary axis P is effectively fixed or may be not used. As the gyroscope sensor 27 is mounted on the support structure 12, the output signals are representative of the vibration of the support structure 12. Such vibration will always be present and OIS is effected by tilting the movable element 11 in opposition. Accordingly, the OIS controller 28 generates movement signals 21 providing a desired movement which is opposite to the actual tilt as measured by the gyroscope sensor 27.

Figure 12:
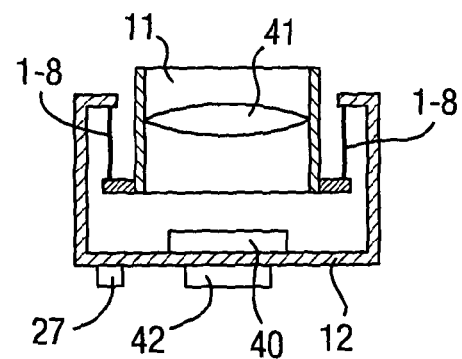
FIG. 12 is a schematic cross sectional view of an SMA actuation apparatus that is a camera apparatus providing OIS and lens movement.

In a second example, the SMA actuation apparatus 10 is a camera apparatus arranged to perform OIS and movement of a lens element along the optical axis, as shown schematically in FIG. 12 which is a cross-sectional view, the cross-section being taken along the primary axis P that is the optical axis. The camera apparatus is to be incorporated in a portable electronic device such as a mobile telephone, media player or portable digital assistant. Thus miniaturisation is an important design criterion.

The support structure 12 is a camera support supporting an image sensor 40 on which there is an IC (integrated circuit) chip 42 in which the control circuit 20 is implemented. The movable element 11 comprises a camera lens element 41 arranged to focus an image onto the image sensor 40. The image sensor 40 captures the image and may be of any suitable type for example a CCD (charge-coupled device) or a CMOS (complimentary metal-oxide-semiconductor) device. The camera apparatus is a miniature camera in which the camera lens element 41 has one or more lenses with a diameter of at most 10 mm.

In this example, OIS is provided by moving the camera lens element 41 laterally of the optical axis. As in the previous case, the control circuit 20 of the SMA actuation apparatus 10 is adapted to include a gyroscope sensor 27 that outputs a signal representative of the angular velocity of the support structure 12, thereby acting as a vibration sensor that detects the vibrations that SMA actuation apparatus 10 is experiencing. The control circuit 20 analyses the output signals from the gyroscope sensor 27 to derive the movement signals 21 that represent the movement of the movable element 11 needed to compensate for the movement of the SMA actuation apparatus 10 as a whole. In this example, the movement signals 21 represent the desired movements y, z along the lateral axes perpendicular to the primary axis P, in opposition to the actual tilt as measured by the gyroscope sensor 27.

In addition, the control circuit 20 generates movement signals 21 representing the desired movement x of the camera lens element 41 along the optical axis, for example to change the field of view or provide focussing, as may be selected by user input or derived by an auto-focussing algorithm. Thus the OIS function and the movement (e.g. focussing) function are combined in the SMA actuation apparatus 10. In this example, no tilting movement is needed so the movement signal 21 representing the desired tilts θ1, θ2 is effectively fixed or may be not used.

The invention claimed is:

1. An SMA actuation apparatus comprising:
a support structure;
a movable element movably supported on the support structure;
an arrangement of eight SMA actuator wires mechanically connected between the support structure and the movable element, the SMA actuator wires being arranged on contraction thereof to drive displacement of the movable element relative to the support structure, the SMA actuator wires being inclined with respect to a notional primary axis with two SMA actuator wires on each of four sides around the primary axis, the SMA actuator wires being mechanically connected between the movable element and the support structure so that on contraction two groups of four SMA actuator wires provide a force on the movable element with a component in opposite directions along the primary axis, the SMA actuator wires of each group being arranged with 2-fold rotational symmetry about the primary axis, the SMA actuator wires having an interconnection at the movable element that electrically connects the SMA actuator wires together; and
a control circuit electrically connected to the of SMA actuator wires at the support structure, without the control circuit being electrically connected to the SMA actuator wires at the movable element, for supplying drive signals to the SMA actuator wires.

2. The apparatus according to claim 1, wherein the control circuit is arranged to supply signals to the SMA actuator wires and further comprises a resistance measurement section arranged to make measurements of voltages and/or currents across the SMA actuator wires during the supply of said signals and to derive a measure of the resistance of each SMA actuator wire from the measurements.

3. The apparatus according to claim 2, wherein the signals have a predetermined current value, and the resistance measurement section is arranged to make measurements of the voltage at the end of each SMA actuator wire in the SMA actuator wires at the support structure.

4. The apparatus according to claim 2, wherein the signals have a predetermined voltage value, and the resistance measurement section is arranged to make measurements of the current across the SMA actuator wires.

5. The apparatus according to claim 2, wherein the signals consist of signals supplied through different combinations of the SMA actuator wires on each side of the interconnection at the movable element, the resistance measurement section being arranged to derive a measure of the resistance of each SMA actuator wire as a function of the measurements across the different combinations of the SMA wires.

6. The apparatus according to claim 5, wherein said signals consist of signals supplied through one of the SMA actuator wires on one side of the interconnection at the movable element and all of the remaining SMA actuator wires in parallel on the other side of the interconnection at the movable element.

7. The apparatus according to claim 3, wherein said signals have a predetermined current value and consist of signals supplied through one of SMA actuator wires on one side of the interconnection at the movable element whilst no signal is supplied through at least one other of the SMA actuator wires so that the voltage of the end of that other SMA actuator wire at the support structure follows the voltage at the interconnection at the movable element, the resistance measurement section being arranged to derive a measure of the resistance of said one of the SMA actuator wires from measurements of the voltages at the ends of the SMA actuator wires at the support structure.

8. The apparatus according to claim 1, wherein the control circuit is arranged to supply drive signals selectively through different combinations of SMA actuator wires on each side of the interconnection at the movable element to vary the heating of individual SMA actuator wires.

9. The apparatus according to claim 8, wherein the control circuit is arranged to vary the heating of individual SMA actuator wires using the measures of electrical resistance as feedback parameters.

10. The apparatus according to claim 9, wherein the control circuit is arranged to vary the heating of individual SMA actuator wires on the basis of an error in respect of each actuator wire between a target resistance for that SMA actuator wire and the measure of resistance for that SMA actuator wire.

11. The apparatus according to claim 8, wherein the control circuit is arranged to supply drive signals selectively through different combinations that consist of one of the SMA actuator wires on one side of the interconnection at the movable element and plural SMA actuator wires in parallel on the other side of the interconnection at the movable element.

12. The apparatus according to claim 11, wherein the control circuit is arranged to supply drive signals selectively through different combinations that consist of one of the SMA actuator wires on one side of the interconnection at the movable element and all of the remaining SMA actuator wires in parallel on the other side of the interconnection at the movable element.

13. The apparatus according to claim 1, wherein the movable element is supported on the support structure solely by the SMA actuator wires.

14. The apparatus according to claim 1, wherein the SMA actuator wires are arranged on contraction thereof to drive displacement of the movable element relative to the support structure with three or more degrees of freedom.

15. The apparatus according to claim 1, wherein the movable element is a camera unit comprising an image sensor and a camera lens element arranged to focus an image on the image sensor.

16. The apparatus according to claim 1, wherein the SMA actuation apparatus is a camera apparatus further comprising an image sensor fixed to the support structure, and the movable element comprises a camera lens element arranged to focus an image on the image sensor.

17. The apparatus according to claim 2, wherein the signals consist of signals supplied through different combinations of the SMA actuator wires on each side of the interconnection at the movable element, the resistance measurement section being arranged to derive a measure of the resistance of each SMA actuator wire as a function of the measurements across the different combinations of the SMA wires.

18. An SMA actuation apparatus comprising:
a support structure;
a movable element movably supported on the support structure;
an arrangement of three or more SMA actuator wires mechanically connected between the support structure and the movable element, the SMA actuator wires being arranged on contraction thereof to drive displacement of the movable element relative to the support structure, a group of three or more of the SMA actuator wires having an interconnection at the movable element that electrically connects the group of SMA actuator wires together; and
a control circuit electrically connected to the group of SMA actuator wires at the support structure, without the control circuit being electrically connected to the SMA actuator wires at the movable element, for supplying drive signals to the SMA actuator wires,
wherein
the control circuit is arranged to supply signals to the group of SMA actuator wires that have a predetermined current value and consist of signals supplied through one of SMA actuator wires on one side of the interconnection at the movable element whilst no signal is supplied through at least one other of the SMA actuator wires so that the voltage of the end of that other SMA actuator wire at the support structure follows the voltage at the interconnection at the movable element, and
the control circuit further comprises a resistance measurement section arranged to make measurements of voltage at the end of each SMA actuator wire in the group of SMA actuator wires at the support structure during the supply of said signals, and to derive a measure of the resistance of each SMA actuator wire from the measurements of said one of the SMA actuator wires from measurements of the voltages at the ends of the SMA actuator wires at the support structure.

19. The apparatus according to claim 18, wherein the control circuit is arranged to supply drive signals selectively through different combinations of SMA actuator wires in said group on each side of the interconnection at the movable element to vary the heating of individual SMA actuator wires.

20. The apparatus according to claim 19, wherein the control circuit is arranged to vary the heating of individual SMA actuator wires using the measures of electrical resistance as feedback parameters.

21. The apparatus according to claim 19, wherein the control circuit is arranged to supply drive signals selectively through different combinations that consist of one of the SMA actuator wires on one side of the interconnection at the movable element and plural SMA actuator wires in parallel on the other side of the interconnection at the movable element.

22. The apparatus according to claim 18, wherein the movable element is a camera unit comprising an image sensor and a camera lens element arranged to focus an image on the image sensor.

23. The apparatus according to claim 18, wherein the SMA actuation apparatus is a camera apparatus further comprising an image sensor fixed to the support structure, and the movable element comprises a camera lens element arranged to focus an image on the image sensor.

24. An SMA actuation apparatus comprising:
a support structure;
a movable element movably supported on the support structure;
an arrangement of three or more SMA actuator wires mechanically connected between the support structure and the movable element, the SMA actuator wires being arranged on contraction thereof to drive displacement of the movable element relative to the support structure, a group of three or more of the SMA actuator wires having an interconnection at the movable element that electrically connects the group of SMA actuator wires together; and
a control circuit electrically connected to the group of SMA actuator wires at the support structure, without the control circuit being electrically connected to the SMA actuator wires at the movable element, for supplying drive signals to the SMA actuator wires,
wherein
the control circuit is arranged to supply signals that consist of signals supplied through one of the SMA actuator wires on one side of the interconnection at the movable element and all of the remaining SMA actuator wires in the group in parallel on the other side of the interconnection at the movable element, and
the control circuit further comprises a resistance measurement section arranged to make measurements of voltages and/or currents across the group of SMA actuator wires during the supply of said signals and to derive a measure of the resistance of each SMA actuator wire as a function of the measurements across the different combinations of the SMA wires.

25. The apparatus according to claim 24, wherein the control circuit is arranged to supply drive signals selectively through different combinations of SMA actuator wires in said group on each side of the interconnection at the movable element to vary the heating of individual SMA actuator wires.

26. The apparatus according to claim 25, wherein the control circuit is arranged to vary the heating of individual SMA actuator wires using the measures of electrical resistance as feedback parameters.

27. The apparatus according to claim 25, wherein the control circuit is arranged to supply drive signals selectively through different combinations that consist of one of the SMA actuator wires on one side of the interconnection at the movable element and plural SMA actuator wires in parallel on the other side of the interconnection at the movable element.

28. The apparatus according to claim 24, wherein the movable element is a camera unit comprising an image sensor and a camera lens element arranged to focus an image on the image sensor.

29. The apparatus according to claim 24, wherein the SMA actuation apparatus is a camera apparatus further comprising an image sensor fixed to the support structure, and the movable element comprises a camera lens element arranged to focus an image on the image sensor.

30. An SMA actuation apparatus comprising:
a support structure;
a movable element movably supported on the support structure;
an arrangement of three or more SMA actuator wires mechanically connected between the support structure and the movable element, the SMA actuator wires being arranged on contraction thereof to drive displacement of the movable element relative to the support structure, a group of three or more of the SMA actuator wires having an interconnection at the movable element that electrically connects the group of SMA actuator wires together; and
a control circuit electrically connected to the group of SMA actuator wires at the support structure, without the control circuit being electrically connected to the SMA actuator wires at the movable element, for supplying drive signals to the SMA actuator wires, wherein the control circuit is arranged to supply drive signals selectively through different combinations of SMA actuator wires in said group that consist of one of the SMA actuator wires on one side of the interconnection at the movable element and plural SMA actuator wires in parallel on the other side of the interconnection at the movable element to vary the heating of individual SMA actuator wires.

31. The apparatus according to claim 30, wherein the control circuit is arranged to supply signals to the group of SMA actuator wires and further comprises a resistance measurement section arranged to make measurements of voltages and/or currents across the group of SMA actuator wires during the supply of said signals and to derive a measure of the resistance of each SMA actuator wire from the measurements.

32. The apparatus according to claim 30, wherein the control circuit is arranged to vary the heating of individual SMA actuator wires using the measures of electrical resistance as feedback parameters.

33. The apparatus according to claim 30, wherein the movable element is a camera unit comprising an image sensor and a camera lens element arranged to focus an image on the image sensor.

34. The apparatus according to claim 30, wherein the SMA actuation apparatus is a camera apparatus further comprising an image sensor fixed to the support structure, and the movable element comprises a camera lens element arranged to focus an image on the image sensor.

* * * * *